March 14, 1961 R. E. MATTESON 2,974,828
VERTICAL CHUTE DISPENSER
Filed April 16, 1958 4 Sheets-Sheet 1

INVENTOR
Russell E. Matteson

BY Karl W. Flocks
ATTORNEY

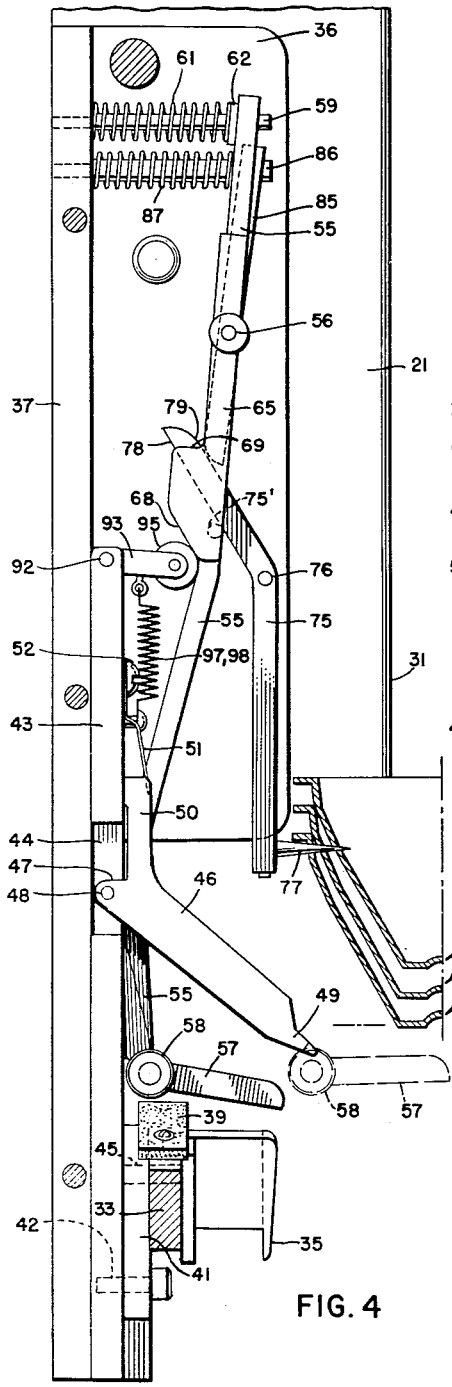
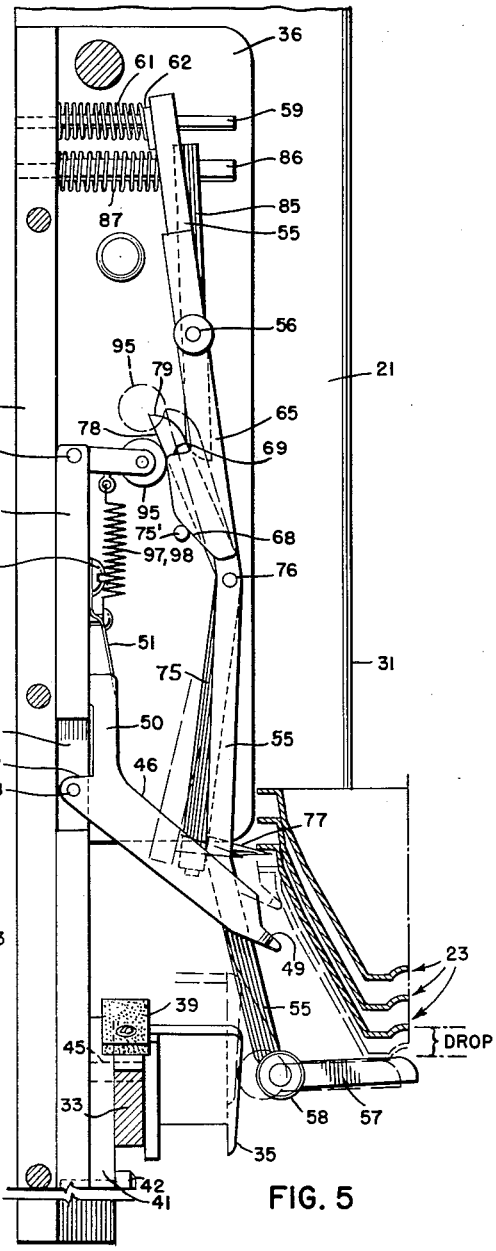

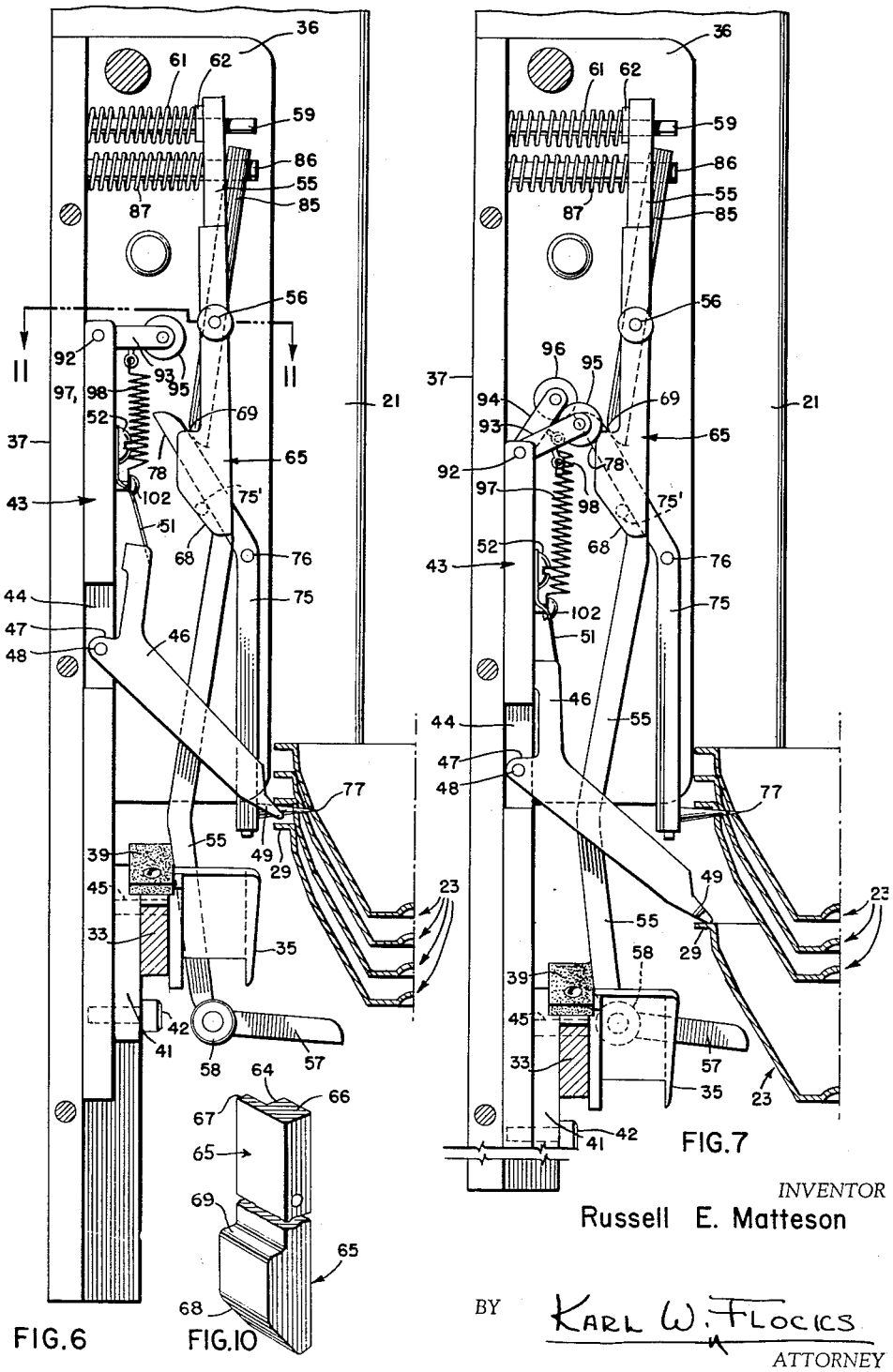

March 14, 1961  R. E. MATTESON  2,974,828
VERTICAL CHUTE DISPENSER

Filed April 16, 1958  4 Sheets-Sheet 4

INVENTOR
Russell E. Matteson

BY Karl W. Flocks
ATTORNEY

United States Patent Office 2,974,828
Patented Mar. 14, 1961

2,974,828

VERTICAL CHUTE DISPENSER

Russell E. Matteson, Morris, Ill., assignor to Diamond National Corporation, a corporation of Delaware Filed Apr. 16, 1958, Ser. No. 728,987

8 Claims. (Cl. 221—221)

The present invention relates to a dispenser, and more particularly to a dispenser for dispensing nested cartons and having means to positively separate the bottommost carton from the stack of cartons.

In the marketing of eggs, it is the practice to have a large quantity of eggs transported in bulk to a central point, called an egg packing room, where they are sized, graded and packed. In modern egg rooms, an egg grader is furnished with a large quantity of eggs which he or she candles and then places into a carton which usually holds a dozen eggs. The egg grader works quite rapidly, picking up three or more eggs at a time with each hand, handling each egg and placing the eggs into the dozen-egg cartons, according to size. As will be apparent, in order to have as many dozens of eggs graded per unit of time, the grader must have the egg supply readily available so that he or she may grasp the desired number of eggs with a minimum of effort and time, candle and then place them in the dozen-egg carton and repeat the operation. It will be apparent that upon filling of one dozen-carton it will be necessary to remove it from the immediate vicinity of the egg grader and to have it replaced by another carton, which is empty. In practice, once an egg carton has been filled with its dozen eggs, it is merely pushed away from the egg grader onto a conveyor belt which conveys the filled carton to automatic closing machinery.

As will be understood from the above, it is necessary that some readily operated and positive means be provided to furnish the replacement carton, it being recognized that one type of widely used carton is made of molded pulp and is shipped to the egg packing room in stacked or nested arrangements in order to conserve shipping space.

Particularly where the egg cartons which are used are of the molded pulp construction, some difficulty is experienced with removing the desired carton from a stack due to the tight nesting of the cartons. Notice will be taken in this connection that the molded pulp has a comparatively rough and soft surface which results in a clinging of one carton to the adjacent cartons, and this clinging action is much more pronounced than in cartons having relatively smoother surfaces.

A further characteristic of molded pulp egg cartons is that while they are sturdy enough for the use for which they are intended, nevertheless they are certainly not rugged and are thus liable to be damaged by strong forces or pressures applied to them; hence, in the problem of providing a mechanical dispenser for egg cartons, this characteristic is of paramount importance.

An object of the present invention is to provide an easily operated dispenser for dispensing one carton from a stack of cartons.

Another object of the present invention is the provision of a dispenser for an egg carton or the like which is sturdy in construction and will operate properly through many repeated uses.

A further object of the present invention is the provision of a dispenser for egg cartons or the like which will remove the lowermost carton of a stack of nested cartons without damaging either the carton which is removed or the cartons which remain.

A further object of the present invention is to provide an egg carton dispenser which will separate the lowermost egg carton from a stack of egg cartons without damage to the cartons separated, and will at the same time hold an entire stack of egg cartons securely and without damaging or deforming them so as to render them unsatisfactory for the service intended.

Other objects and the nature and advantages of the instant invention will be apparent from the following description taken in conjunction with the accompanying drawings, wherein:

Figs. 4, 5, 6 and 7 are views to an enlarged scale, taken substantially on line 4—4 of Fig. 3, showing one group of parts of the dispenser in successive positions during the dispensing operation.

Fig. 10 is a view of a cam bar forming part of the dispenser.

Figure 1:
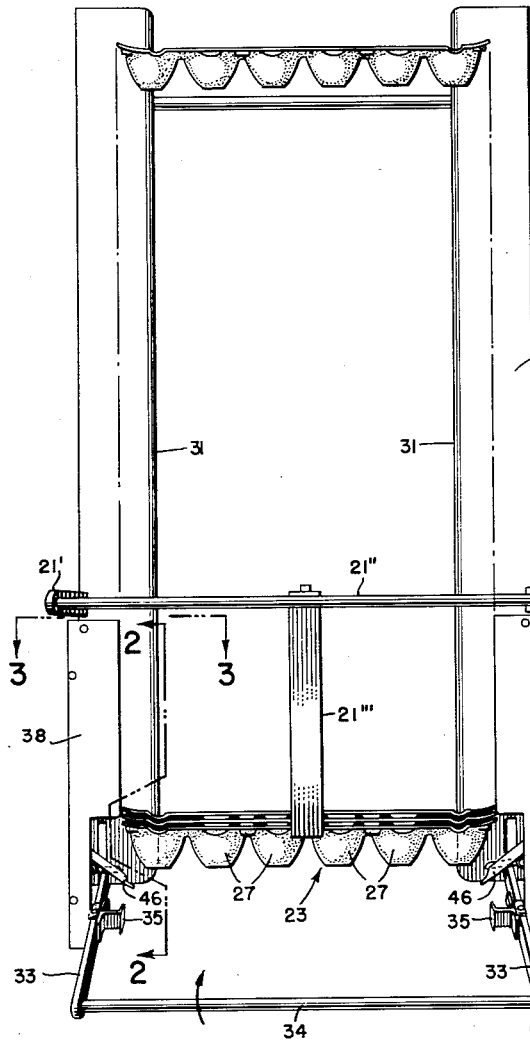
Fig. 1 is a front elevational view of an egg carton dispenser in accordance with the present invention.
Figure 3:
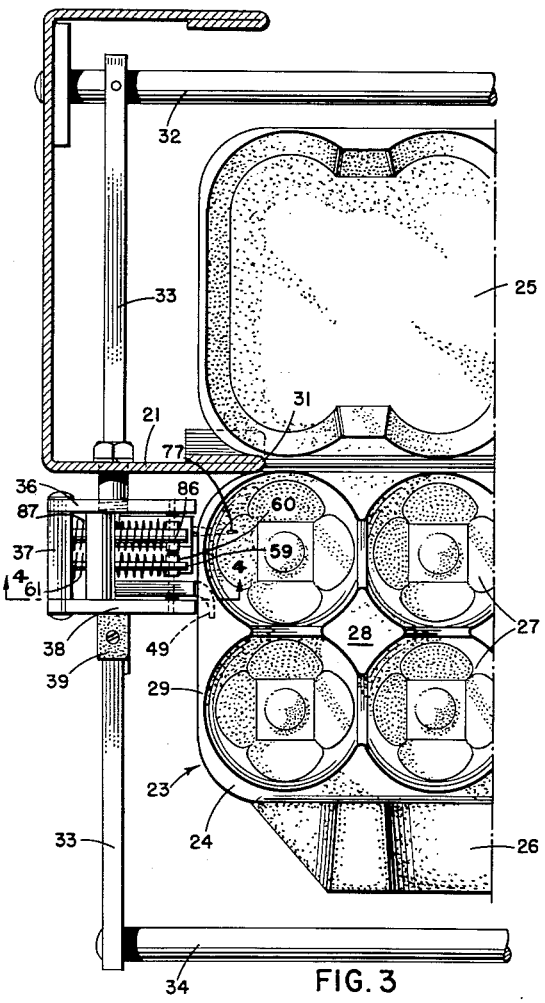
Fig. 3 is a cross-sectional view taken on the line 3—3 of Fig. 1 to an enlarged scale.

Referring now to the drawings where like reference numerals are used to designate like or corresponding parts throughout the several views, there is shown in Figs. 1 and 3 a dispenser 20 comprising a chute 21 and a dispenser mechanism 22 attached at the lower part thereof. There may also be seen in Figs. 1 and 3 the molded pulp egg carton which the dispenser of the present invention is particularly adapted to handle, and there may be seen therein the egg carton 23 having a bottom section 24, a top section 25 and a locking flap 26 attached to the bottom section 24. Bottom section 24 is formed with a plurality of egg cells 27 separated by upstanding posts 28, and having outwardly extending marginal flanges 29. The egg cells 27 depend downwardly, and the cartons 23 are nested as shown in Fig. 1 by disposing the cells 27 and posts 28 in adjoining cartons.

Figure 2:
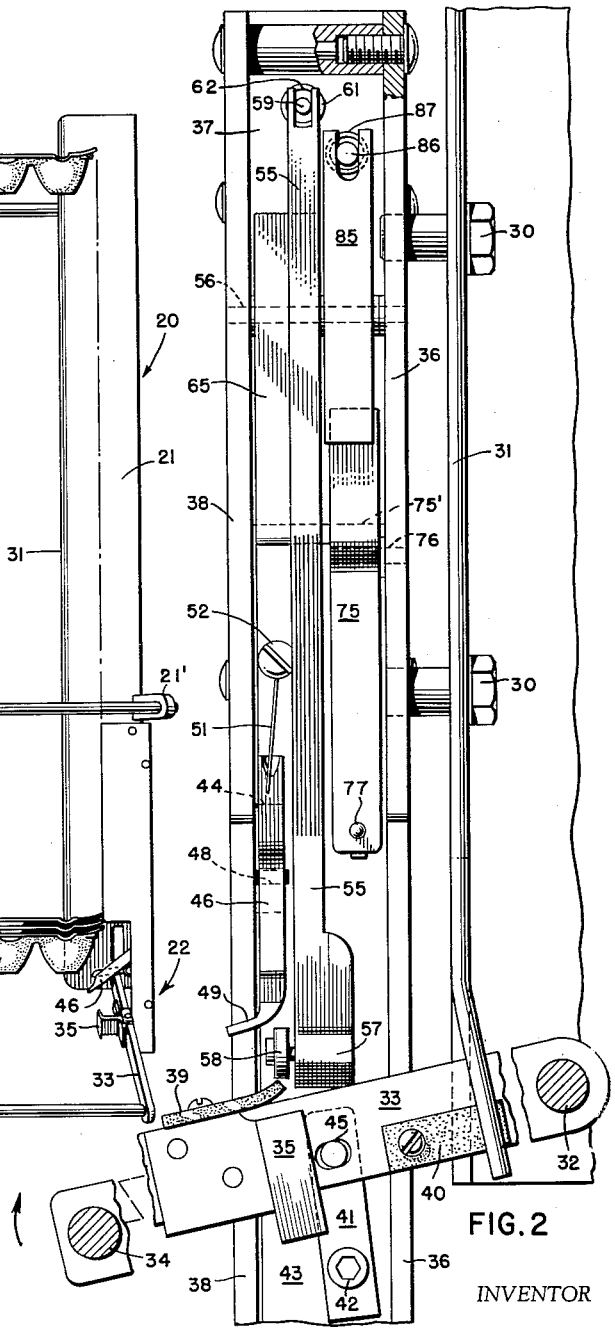
Fig. 2 is a view taken on the line 2—2 of Fig. 1 to an enlarged scale.

As may be seen in Fig. 3, the top section 25, the bottom section 23 and the flap 26 are in an unfolded condition wherein they may be considered to be generally in a horizontal plane. The chute 21 has a guide portion 31 which extends into an indentation formed in the egg carton 23 when the top section 25 is in an open condition with respect to the bottom section 24. Guide portion 31 extends substantially vertically, the lower part thereof being inclined as shown in Fig. 2. The egg cartons 23 are placed into the chute 21 at the top thereof, and fill the chute in stacked relationship. Projecting forwardly from opposite sides of the chute 21 and above the dispensing mechanism 22 are a pair of support arms 21' which support at their terminal ends a transverse rod 21" which supports a depending guide strap 21''' to aid in orienting the cartons 23 as they descend in the chute.

As may be seen in Fig. 1, the dispensing mechanism 22 comprises two parts, a left and a right part, and it will be understood from Fig. 1 and from a consideration of the description of the invention as it proceeds hereinafter that the left and right parts are substantially mirror images of each other. Hence, it will be necessary in the following discussion to understand that the left part of the mechanism 22, as seen in Fig. 1, has been illustrated throughout the drawings, but that the right part is of course present in the complete structure.

In order to expedite the understanding of the invention, and due to the fact that parts move in relation to each other, where a part moves towards the egg carton, it will be considered as moving inwardly and where a part moves away from the egg carton it will be considered as moving outwardly. In addition, that part of the dispenser 20 and dispensing mechanism 22 which is closest to the viewer in the Fig. 1 illustration of the invention has been designated as the front. It will be understood that these designations are descriptive only and are not intended in any way to limit the specification or the claims appended thereto.

Figure 8:
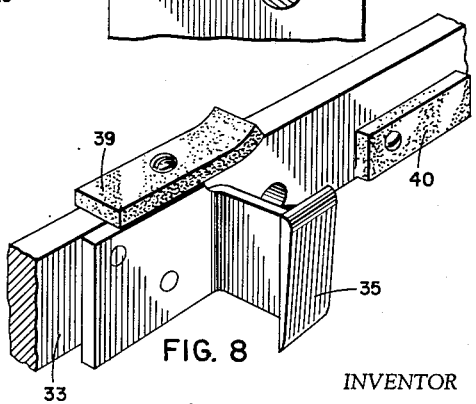
Fig. 8 is an enlarged fragmentary perspective view of a cam mounted on a handle side arm.

In Fig. 3 there may be seen secured to the rear of the chute 21 a shaft 32 to which is secured a side arm 33 of a handle 34. Handle side arm 33 has extending inwardly thereof a cam 35. Cam 35 may be seen in detail in Fig. 8, where there may be also seen in place thereabove a cushioning member 39. There may be also seen on the handle side arm 33 a second cushion member 40. A U-shaped frame comprising plates 36, 37 and 38, which are secured together by any suitable means, is secured to the chute 21 by bolts 30.

Figure 9:
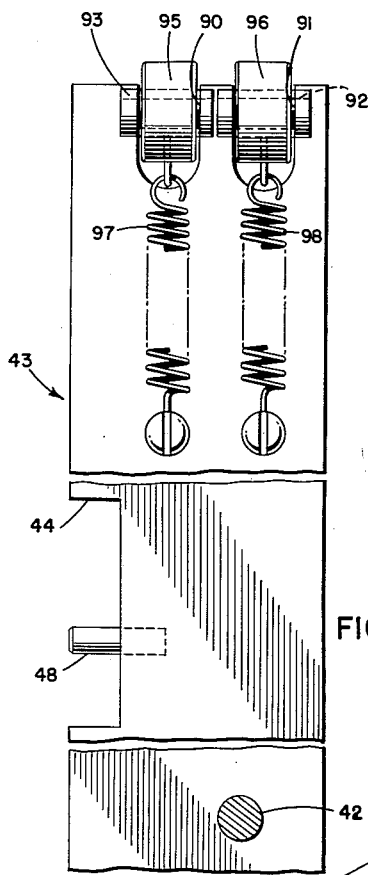
Fig. 9 is a further enlarged fragmentary elevational view of a slide forming a part of the dispenser, with parts broken away.
Figure 11:
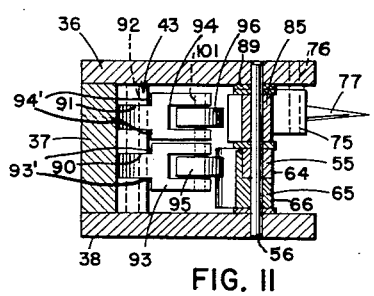
Fig. 11 is a cross-sectional view taken on the line 11—11 of Fig. 6.

As may be seen in Fig. 2, a link 41 is pivotally secured at its upper end by pin 45 to handle side arm 33 and is attached at its lower end to a slide 43. Slide 43, as shown in Fig. 9, is generally rectangular in elevation. There may be seen in Figs. 2 and 9 a shaft 42 which serves to pivotally connect the link 41 and the slide 43. As is best seen in Fig. 11, slide 43 is positioned in the U-shaped frame 36, 37 and 38 and is guided therein.

Referring now to Fig. 9, the slide 43 may be seen to have a recess 44 in the front side thereof. In Fig. 4, where the plate 38 has been removed in order to better show the parts, the slide 43 may be seen positioned against the plate 37 with the recess 44 therein.

A separator 46 having an outwardly extending heel member 47 is pivotally attached to the slide 43 by a pin 48 which extends through the heel 47 of the separator 46 and enters into the slide 43. The lower end 49 of separator 46 extends inwardly and is tapered as clearly shown in Fig. 4. The upper end of separator 46 has an arm 50 which is urged into engagement with slide 43 by a wire spring 51 secured to the slide 43 by a screw 52. As may be seen in Fig. 2, the lower end 49 of separator 46 is curved towards the front i.e. toward handle 34.

A support 55 comprises a relatively long lever which is pivoted on a shaft 56 that is supported by the plates 36 and 38 of the U-shaped frame member. The lower end of support 55 is angled to form a support arm 57 which extends inwardly. A roller 58 is journalled to support 55 at one side thereof at the angle formed by support arm 57. As may be seen in Fig. 2, roller 58 is to the front of support 55. The upper end of support 55 is furcated as shown in Figs. 2, 3 and 4 and receives through the space 60 thus provided one end of a rod 59 which is secured to the side plate 37 and which has a spring 61 coiled thereabout, it being understood that spring 61 engages the plates 37 and a washer 62 to urge the upper end of support 55 inwardly.

A cam bar 65 is journalled on the shaft 56 to the front of support 55. Cam bar 65, as may be seen in Figs. 10 and 11 has a main generally rectangular body portion 66 and a shelf-like extension 67 extending therefrom, so as to form therebetween a recess 64. At the lower end of cam bar 65 there is a cam surface 68 having a relatively sharp break 69 with the planular face of the body portion 66 and extension 67. As best seen in Figs. 2 and 11, the support 55 fits into the recess 68, and the extension 67 is in contact with the outer face of support 55 over a substantial portion of its length and extending above and below the shaft 56. It may thus be seen that support 55 and cam bar 65 will rotate about shaft 56 as a unit.

A pin lever 75 is rearwardly of the support 55 and is mounted for rotation about a pin 76. At its lower end, pin lever 75 carries a pin 77 which is inwardly directed. The upper arm of pin lever 75 has a cam bar engaging surface 78 on the under side thereof and a second cam bar engaging surface 79 on the upper side thereof which is engaged by the lower end of a press lever 85, see Figs. 2 and 4, that is pivotally mounted on the shaft 56 and has its upper end furcated to provide space 88 for a rod 86, see Fig. 3. A spring 87 is coiled about rod 86 and engages the plate 37 and a washer at the upper end of press lever 85. Suitable washers 89 placed on shaft 56 prevent binding of support 55, cam bar 65 and press lever 85. As seen in Figs. 4–7, an abutment pin 75′ projects laterally from plate 36 beneath lever 75 to limit counterclockwise movement of the lever.

Referring now to Figs. 9 and 11, it may be seen that the upper end of slide 43 has a pair of openings 90 and 91 therein through which a shaft 92 extends, and mounted on the shaft 92 are a pair of forks 93 and 94 maintained substantially horizontally by shoulder portions 93′ and 94′ abutting slide 43 (see Fig. 11), fork 93 carrying at its inner end a pin 99 on which is rotatably mounted roller 95 and fork 94 likewise rotatably carrying a roller 96 mounted on a pin 101. Springs 97 and 98 are each secured at their upper ends to the under side of the forks 93 and 94, respectively, see Fig. 4, and are secured at their lower ends to the slide 43 by screws 102 and 103, respectively. The springs 97 and 98 urge the forks 93 and 94 into the position shown in Fig. 4, this being the limiting downward position, and the forks 93 and 94 may be rotated upwardly (or counterclockwise as shown in Figure 7) against the urging of the springs 97 and 98.

In operation, the handle 34 and handle side arms 33 are in the position shown in Figs. 1, 2 and the solid lines of Fig. 4. With reference to Fig. 4, it may be seen that the cartons 23 are in stacked condition and the bottom three, which are the ones shown, are supported by the pin 77 which penetrates these bottom three cartons 23. The remainder of the cartons in the stack, which are not shown, are supported by the bottom three cartons 23, as will be understood. Thus, pin 77 is in its inner position, and is maintained in that position because of the urging of spring 87 on the upper end of press lever 85, the lower end of press lever 85 in turn acting on the cam surface 79 of the upper end of pin lever 75. Slide 43 is in its lower position and spring 51 causes the upper end of separator 46 to be in its inner position, attention being invited to the fact that the upper arm 50 of separator 46 is abutting against the face of slide 43. The upper end of support 55 is in its outer position, being urged there by the action of spring 61 against the upper end thereof. It will also be noticed that fork 93 is in its most clockwise position and that roller 95 is in engagement with the lower end of cam surface 68 of cam bar 65.

Upon raising of the handle 34, see the direction arrows of Figs. 1 and 2, handle side arms 33 will be caused to rotate upwardly about shaft 32, shown in Figs. 2 and 3. Due to the connection by link 41 of handle side arm 33 and slide 43, the latter will be caused to move upwardly in the U-shaped frame. This action will cause roller 95 to move upwardly and due to its engagement with cam surface 68, cam bar 65 will be caused to rotate counter-clockwise and since cam bar 65 and support 55 act together, due to extension 67 on bar 65, support 55 will also be caused to rotate counterclockwise. This will cause support arm 57 to move to its inner position, shown in dotted lines in Fig. 4 and in full lines in Fig. 5.

Further upward movement of slide 43 will cause roller 96 carried by the rearmost fork 94 to engage cam surface 78 of pin lever 75 to rotate it in a clockwise manner, and thus to move pin 77 to its outer position, it being there withdrawn from the cartons 23. Upon withdrawal of pin 77 from the cartons 23, they will be permitted to drop downwardly onto the support arm 57 which retains them. At about the time that the roller 96 is co-operating with the cam engaging surface 78, roller 95 is no longer in engagement with cam bar 65. However, spring 61 cannot rotate support 55 to its inner position due to the fact that upon clockwise rotation of support 55, the roller 58 will be engaged by the cam 35 carried by the handle side arm 33 to hold support 55 and support arm 57 in the dotted line position shown in Fig. 5.

In Fig. 6, it may be seen that handle side arm 33 has continued its upward movement and that roller 96 has passed above the upper end of pin lever 75, so that subsequent to the drop of the stack of cartons 23 the spring 87 has acted on the press lever 85 to cause movement of pin lever 75 to the in position as shown, pin 77 now penetrating the second, third and fourth cartons, and no longer penetrating the bottommost carton. Also, cam 35 has passed above the roller 58 of support 55, so that support arm 57 is now in the outer position, as is shown in Fig. 6. In this outer position, the outer side of support 55 engages with cushion 40. Separator 46 has been rotated clockwise by the marginal flange 29 of lowermost carton 23 as carton 23 and separator 46 moved relative to each other, separator 46 moving against the urging of spring 51; after flange 29 is out of contact with separator 46, spring 51 urges the lower end 49 between the marginal flanges 29 of the lowermost and the next to lowermost cartons 23. It will be understood that once the roller 96 passes out of contact with camming surface 78 of pin lever 75, the spring 87 will cause pin lever 75 to rotate with necessary force to drive pin 77 into and through the cartons 23. Should the handle side arm 33 be carried further upwardly, the cushion 39 will strike a downwardly facing shoulder of plate 38, which has been removed as above noted from Figs. 4, 5, 6 and 7 to clearly illustrate the parts.

The handle 34 is now moved downwardly, and as this pulls the slide 43 downwardly, separator 46, by virtue of the engagement of its lower end 49 with the upper part of the margin 29 of the lowermost carton 23, will cause said carton to separate from the stack of cartons and the carton will be positively and firmly urged downwardly. At the same time, roller 96 will strike the extreme upper end of pin lever 75, and will pivot about the shaft 92 and against the urging of spring 98. Similarly, engagement of roller 95 with cam bar 65 will not cause the support 55 to move from its outer position. As may be seen in Fig. 7, the roller 58 is in such a position that it is passed on either side by the handle side arm 33 and by the non-working face of cam 35. Cam 35 does not strike against support arm 57 because it swings in an arc about the axis of bar 32 (see Fig. 3), it being understood that handle side arm 33 is broken away in Fig. 2 and the distance between cam 35 and bar 32 is therefore foreshortened in this figure. Further downward movement of handle 34 permits the support 55 and pin lever 75 to remain in the position shown in Fig. 7, slide 43 being carried downward to the lowest position thereof wherein the parts are again as shown in Fig. 4.

There has been provided a machine which is positive in action and which separates the lowermost egg cartons from a stack of nested molded pulp egg cartons without damage either to the carton which is separated or to the cartons remaining in the stack.

While the invention has been disclosed in connection with molded pulp egg cartons, it will be understood that other articles may be as readily dispensed with the apparatus described herein.

It will be obvious to those skilled in the art that various changes may be made without departing from the spirit of the invention and therefore the invention is not limited to what is shown in the drawings and described in the specification, but only as indicated in the appended claims.

I claim:

1. A dispenser for egg cartons and the like comprising a vertically disposed chute for cartons including a pair of opposed dispenser mechanisms at opposite sides of the lower end thereof, each dispenser mechanism comprising an inwardly directed U-shaped vertically extending frame, a vertically displaceable slide in said frame, a recess in one edge of said slide, a separator comprising an angled lever having two arms pivotally secured at the juncture of said arms to said slide in said recess, one of said arms extending inwardly, a spring carried by said slide and engaging the other arm of said separator to urge said one arm inwardly, first and second substantially horizontally supported and inwardly extending forks pivotally mounted for upward movement at one end to the upper end of said slide and disposed in side-by-side relation thereon, a roller secured to the other end of each fork, a pair of springs each secured to said slide and to one of said forks urging said forks to said substantially horizontal position relative to said slide, a support pivotally secured to said frame and having an inwardly extending support arm at the lower end thereof, a roller journaled on said support adjacent the lower end thereof, cam bar means pivoted on said frame and including an abutment portion engageable with said support for attaining simultaneous pivotal movement therewith in one direction and engageable with one of said fork-carried rollers, a spring engaging said frame and the upper end of said support and urging said support outwardly against said cam bar abutment portion, a pin lever intermediately pivoted on said frame and carrying an inwardly extending pin at its lower end and having a camming surface at the upper end thereof for engagement with the other fork-carried roller, a press lever intermediately pivoted on said frame, the lower end of said press lever engaging the upper end of said pin lever to urge the lower end of said pin lever and pin inwardly, a spring engaging said frame and the upper end of said press lever for urging the same inwardly, a handle having side arms pivoted to said chute about a horizontal axis, a link pivoted to said side arm and the lower end of said slide, and a vertically extending cam secured to said side arms inwardly thereof and engageable with the roller of said support.

2. In a dispenser for egg cartons and the like comprising a vertically disposed chute, a dispenser mechanism comprising a vertically extending frame, a vertically displaceable slide in said frame, a separator comprising an angled lever intermediately pivoted to said slide and having one arm extending inwardly therefrom, biasing means carried by said slide and engaging said separator to urge said one arm inwardly, first and second substantially horizontally supported and inwardly extending forks pivotally mounted for upward movement at one end to the upper end of said slide and in side-by-side relation on said slide, a roller secured to the inner end of the forks, spring means secured to said slide and to said forks urging each of said forks to said substantially horizontal position relative to said slide, support means pivotally secured to said frame and having an inwardly extending support arm at the lower end thereof, a roller journaled on said support means adjacent the lower end thereof, said support means comprising cam means for engaging one of said fork-carried rollers, a roller journaled on said support means adjacent the lower end thereof, cam means pivotally mounted on said frame and including a portion engageable with said support means for movement in one direction therewith and including a portion engageable with one of said fork-carried rollers, second biasing means engaging said frame and the upper end of said support means and normally urging said support means outwardly against said cam means, a pin lever intermediately pivoted on said frame and carrying an inwardly extending pin at its lower end and having a camming surface at the upper end thereof for engagement with the other fork-carried roller, a press lever intermediately pivoted on said frame, the lower end of said press lever normally engaging the upper end of said pin lever and normally urging said pin inwardly, third biasing means engaging said frame and the upper end of said press lever and urging the upper end of said press lever inwardly, a side arm pivoted about a horizontal axis spaced from said frame, a link connected to said side arm at the lower end of said slide, and a vertically extending cam secured to said slide arm inwardly thereof and engageable with the roller of said support means.

3. In a dispenser for egg cartons and the like comprising a vertically disposed chute from which cartons will be dispensed, a dispenser mechanism comprising a vertically extending frame, a vertically displaceable slide mounted in said frame, a separator comprising an angled lever intermediately pivoted to said slide, one of said arms extending away from said frame, biasing means carried by said slide and engaging the other arm of said separator to urge said one arm away from said slide, first and second roller means mounted on the upper end of said slide and in side-by-side relation thereon, support inwardly extending support arm at the lower end thereof, means pivotally secured on said frame and having an roller means journaled adjacent the lower end with said support means, cam means pivoted on said frame and including a portion engageable with said support means for moving the same therewith in one direction and including a portion engageable with one of said roller means on the slide, second biasing means engaging said frame at the upper end of said support means and urging said support arm outwardly against the portion of said cam means, pin lever means intermediately pivoted on said frame and including an inwardly extending pin at its lower end and having camming surface means at the upper end thereof for engagement with the other roller means on said slide, press lever means intermediately pivoted on said frame, the lower end of said press lever means engaging the upper end of said pin lever means to urge said pin inwardly, third biasing means engaging said frame and the upper end of said press lever means to urge the upper end of said press lever means inwardly, an arm pivoted about a horizontal axis spaced from said frame, a link pivoted to said arm and the lower end of said slide, and cam means secured on said arm inwardly thereof and engageable with the roller means on said support means.

4. A dispenser for egg cartons and the like comprising a vertically disposed chute including a pair of opposed dispenser mechanisms on a lower portion thereof, each dispenser mechanism comprising a vertically extending frame, a vertically displaceable slide in said frame, a separator comprising an angled lever including two arms intermediately pivoted on said slide, one of said arms extending inwardly beneath said chute, biasing means carried by said slide and engaging the other arm of said separator normally urging said one arm inwardly, first and second roller means mounted on the upper end of said slide and in side-by-side relation thereon, support means pivotally secured to said frame and having an inwardly extending support arm adjacent the lower end thereof, roller means journaled on said support means adjacent the lower end thereof, cams means journaled on said frame and including a portion engageable with said support means for movement therewith in one direction, second biasing means engaging said frame in the upper end of said support means and normally urging said support arm outwardly, pin lever means intermediately journaled on said frame and carrying an inwardly extending pin at its lower end and having camming surface means at the upper end portion thereof for engagement with the other roller means on said slide, a press lever means intermediately pivoted on said frame, the lower end of said press lever means engaging the upper end of said pin lever means and normally urging said pin inwardly, third biasing means engaging said frame in the upper end of said press lever means normally urging the upper end thereof inwardly, vertically pivotal arms mounted about a horizontal axis on said chute and spaced from said dispenser frames, a link pivoted to said arms in the lower ends of said slides, and cam means secured on said arms inwardly thereof and engageable with the roller means of said support means.

5. A dispenser for egg cartons and the like comprising a vertically disposed chute including opposed dispenser mechanisms adjacent the lower end thereof, said dispenser mechanisms comprising a vertically extending frame, a vertically displaceable slide in said frame, an angled lever intermediately journaled to said slide and including one arm normally biased inwardly, first and second rollers journaled on the upper end of said slide, support means pivotally mounted on said frame and having a lower inwardly extending support arm, a roller journaled on said support means adjacent the lower end thereof, cam means journaled on said frame and including a portion engageable with said support means for affording a simultaneous movement therewith in one direction, spring means normally urging said support arm outwardly against said cam means, a pin lever intermediately journaled on said frame and including a lower inwardly extending pin, said pin lever including an upper camming surface engageable with the other roller on said slide, means yieldably urging said pin inwardly, and force transmitting means journaled on said chute on an axis of rotation spaced from said frame for vertically displacing said slide.

6. A dispenser for vertically stacked egg cartons and the like comprising vertically disposed storage chute means from which cartons will be vertically dispensed in a predetermined vertical path of travel, opposed dispenser mechanisms at lower portions of said chute means, said dispenser mechanisms comprising a slide supported for vertical displacement, a separator journaled on said slide and including a lower portion normally biased into the path of descent of articles being dispensed and displaceable therefrom, a support comprising a vertically disposed lever intermediately pivoted on said chute and including a lower article support portion normally biased out of the path of descent of the articles being dispensed and displaceable therebeneath, a pin lever intermediately pivoted on said chute and including a lower inwardly extending pin normally biased into the path of descent of said articles and penetrable therethrough and displaceable out of said path of descent, cam bar means including a portion engageable with the lever of said support for affording movement therewith in one direction, means on the upper portion of said slide for engaging said cam bar and for coordinating movement thereof with said support and pin lever, and an operating handle connected to said slide for displacing said slide vertically and including a portion for retaining the lower article support portion of said support inwardly for receiving a dispensed article thereon.

7. A dispenser mechanism including a chute defining a path of descent of articles being dispensed, said mechanism comprising a support arm, means mounting said support arm for movement inwardly and outwardly relative to said path of descent, an inwardly directed pin, means mounting said pin for movement inwardly and outwardly relative to said path of descent, a separator, means mounting said separator for movement parallel to said path of descent, means urging said separator into said path of descent and permitting said separator to be displaced outwardly of said path of descent by engagement with the lowermost articles being dispensed, means operable in response to movement of said operator to move said support arm from an outer position relative to said path of descent to an inner position in said path of descent, and means operable in response to movement of said operator to move said pin from an inner, article penetrating position in said path of descent to an outer position to thereby withdraw said pin from an article in said path of descent, said means urging said separator inwardly operating in response to upward movement by said operator to permit said separator to be displaced outwardly by the lowermost article being dispensed and subsequently engaging the article during downward movement by said operator to cause the lowermost article to be dispensed.

8. The structure of claim 7; and means yieldably urging said pin to an inner position into said path of descent during which it penetrates an article in said path of descent.

References Cited in the file of this patent

UNITED STATES PATENTS

| | | |
|---|---|---|
| 1,396,995 | Cooley | Nov. 15, 1921 |
| 1,636,208 | Bergman | July 19, 1927 |
| 1,722,048 | Hill | July 23, 1929 |
| 1,734,108 | Bergman | Nov. 5, 1929 |
| 1,742,371 | Simmons | Jan. 7, 1930 |
| 1,864,008 | Wright | June 21, 1932 |
| 1,963,621 | Geyer | June 19, 1934 |
| 1,964,335 | Wessman | June 26, 1934 |
| 2,385,267 | Franz | Sept. 18, 1945 |
| 2,445,958 | Lindstrom | July 27, 1948 |
| 2,538,185 | Anderson | Jan. 16, 1951 |